(12) United States Patent
Ghosh (10) Patent No.: US 11,271,241 B1
(45) Date of Patent: Mar. 8, 2022

(54) STACKABLE FUEL CELL

(71) Applicant: Chuni Lal Ghosh, Princeton Junction, NJ (US)

(72) Inventor: Chuni Lal Ghosh, Princeton Junction, NJ (US)

(*) Notice: Subject to any disclaimer, the term of this patent is extended or adjusted under 35 U.S.C. 154(b) by 0 days.

(21) Appl. No.: 17/446,301

(22) Filed: Aug. 29, 2021

Related U.S. Application Data

(60) Provisional application No. 63/073,286, filed on Sep. 1, 2020.

(51) Int. Cl.
| | |
|---|---|
| *H01M 8/2484* | (2016.01) |
| *H01M 8/0245* | (2016.01) |
| *H01M 8/0258* | (2016.01) |
| *H01M 8/0267* | (2016.01) |
| *H01M 8/0271* | (2016.01) |
| *H01M 8/0236* | (2016.01) |
| *H01M 8/242* | (2016.01) |

(52) U.S. Cl.
CPC ....... *H01M 8/2484* (2016.02); *H01M 8/0236* (2013.01); *H01M 8/0245* (2013.01); *H01M 8/0258* (2013.01); *H01M 8/0267* (2013.01); *H01M 8/0271* (2013.01); *H01M 8/242* (2013.01)

(58) Field of Classification Search
CPC ............. H01M 8/2484; H01M 8/0236; H01M 8/0245; H01M 8/0258; H01M 8/0267; H01M 8/0271; H01M 8/242
See application file for complete search history.

(56) References Cited

U.S. PATENT DOCUMENTS

| | | |
|---|---|---|
| 6,063,517 A | 5/2000 | Montemayor |
| 7,294,425 B2 | 11/2007 | Hodge |
| 7,335,436 B2 | 2/2008 | Kim |
| 8,192,889 B2 | 6/2012 | Spink |
| 8,277,996 B2 | 10/2012 | Okusawa |
| 8,597,846 B2 | 12/2013 | Spink |
| 8,741,500 B2 | 6/2014 | Fujita |
| 9,761,895 B2 | 9/2017 | Takahashi |
| 2002/0110720 A1 | 8/2002 | Yang |
| 2004/0096718 A1 | 5/2004 | Gomez |

(Continued)

FOREIGN PATENT DOCUMENTS

| | | |
|---|---|---|
| CN | 111477907 A | 7/2020 |
| CN | 112038657 A | 12/2020 |
| CN | 212848508 U | 3/2021 |

*Primary Examiner* — Muhammad S Siddiquee (57) ABSTRACT

A lightweight electrochemical fuel cell suitable for modular stacking to achieve high output power is described. The electrochemical fuel cell is constructed of a stack of flexible polymer layers sealed at the periphery to create fuel and reactant channels. To scale up the output power, the electrochemical fuel cell is stacked on an external mechanical frame, wrapped-over on to itself in a self-supported 3-dimensional form, or wrapped over around a central mandrel to increase the active area of the fuel cell The electrochemical fuel cell has built in current collecting means and sealed electrodes to eliminate the need for bipolar plates, thereby enabling applications requiring high output power while maintaining a low weight. The thermal management is external to the fuel cell core structure to facilitate modular expansion of the stack to achieve high output power.

26 Claims, 6 Drawing Sheets

(56) References Cited

U.S. PATENT DOCUMENTS

2007/0238004 A1* 10/2007 Osenar ................ H01M 8/0297
                                                                    429/434
2008/0138670 A1    6/2008 Johnston
2011/0229787 A1    9/2011 Kozakai
2011/0318668 A1* 12/2011 Lee .................... H01M 8/0245
                                                                    429/481

* cited by examiner

STACKABLE FUEL CELL

CROSS-REFERENCE TO RELATED APPLICATIONS

This application is related to the U.S. Provisional Patent Application No. 63/073,286 filed on Sep. 1, 2020, which is being incorporated by reference herein in its entirety.

STATEMENT REGARDING FEDERALLY SPONSORED RESEARCH OR DEVELOPMENT

Not Applicable.

BACKGROUND OF THE INVENTION

Field of the Invention

This invention is related to the field of energy generation, and in particular to energy generation in a fuel cell by way of an electrochemical reaction with zero carbon emission. This invention is directed to a fuel cell design and an architecture suitable for construction of compact stackable fuel cells. The fuel cells described in this invention are flexible and modularly stackable without the bipolar plates that are typically used for current collection and mechanical support in prior art constructions.

Related Background Art

An electrochemical reaction in a fuel cell generates a potential difference between an anode and a cathode (electrodes) that are in electrical contact with the reacting species. The charge collection at the electrodes enables a flow of electric current through an externally connected load between the electrodes. The energy generation in an electrochemical fuel cell does not involve combustion of a fuel, and hence it is free from carbon emission. That makes it very attractive for carbon footprint reduction.

The most common type of fuel cell is the Proton Exchange Membrane (PEM) fuel cell where the byproduct of the electrochemical reaction is typically water, which is easy to dispose of with minimal environmental impact. Additionally, the process does not involve any mechanically moving parts (and associated noise). Therefore, the energy generation using a fuel cell holds huge promise for a wide range of applications including military and aerospace applications, low emission automobiles, agriculture machinery, just to name a few.

In most prior art PEM electrochemical fuel cells, the key components of a cell unit are, a Membrane Electrode Assembly (MEA) typically including a PEM, and two highly conductive current collection plates (an anodic and a cathodic plate, respectively) located on the opposite sides of the MEA. A layered structure of the MEA and the current collection plates sealed at the periphery, create two independent fluid flow fields of opposite polarities (anodic and cathodic) on the opposite sides of the PEM, each facing the MEA surface of the like polarity. Typically, one fluid is a fuel, and the second fluid on the opposite side of the PEM is a reactant. For the current to flow in an external load, the current collection plates are electrically connected to the respective electrodes of the MEA with like polarities. In a typical PEM fuel cell, the current collection plates are constructed of a highly conducting material such as a metal or graphite.

Separate gas diffusion layers (GDLs) on either side of the PEM facilitate the diffusion and distribution of the fuel and the reactant across the PEM in the fluid flow fields. In some devices, the GDL is optional. The GDLs may include additional physical structures (grooves or channels) to enhance the interaction of the fluids (fuel and the reactant) across the PEM. Typically, hydrogen or hydrogen reformates like, methanol, ethanol, methane, etc. are used as the fuel, with a reactant that is oxygen or air.

Wide scale acceptance of prior art fuel cell technology in commercial applications is constrained by factors that limit the output power. A common approach to increasing the output power to a desired level for any application is, to add a plurality of fuel cell units in two or three-dimensional stacks. One disadvantage of this basic stackable structure is that the bipolar plates contribute towards ~50% of the volume and ~80% of the weight in most prior art PEM fuel cell stacks thereby, making these stacks less practical for applications where portability is desired.

Another disadvantage in expanding a prior art fuel cell stack by adding more fuel cell units is non-uniform distribution of the reacting fluids (fuel, reactant, or both) throughout the volume of the stack. The rate of the electrochemical reaction is determined by the supply of the reacting species in required proportions. The rate of electrochemical reaction, and therefore the conversion efficiency will be limited if the supply of the reacting species is not adequate. A secondary effect is that the heat and humidity generated as a result of the electrochemical reaction is not dissipated uniformly throughout the volume of the stack, thereby further limiting the conversion efficiency.

A large volume of prior patent literature on PEM fuel cells particularly arranged in stacks, pertains to improving thermal and humidity management to improve upon the conversion efficiency. In most common form of the PEM fuel cell stack, adjacent fuel cell units are separated by a bipolar current collection plate. In a bipolar plate, the two opposite broadside surfaces of the current collection plate are of opposite electric polarity, such that the anodic and the cathodic fluid flow regions of the adjacent fuel cell unit interface with the like polarity surface of the bipolar plate. Typically, the bipolar plates are heavy and therefore, scaling up the design for higher output power beyond a point, is not a viable option for improving efficiency while maintaining low volume and weight for portability.

To tackle the problems of the prior art fuel cells, considerable effort has been devoted to increasing efficiency of the PEM fuel cell stack by combining several design features to improve uniformity of the fluid distribution and diffusion and to manage heat dissipation uniformly throughout the volume of the stack. For example, in the Chinese Patent Publication CN 212848508 U by Xinde, published on Mar. 30, 2021, in an integrated stack, the adjacent fuel cell units separated by bipolar plates share common fluid distribution and heat management arrangements by distributed cooling fluid channels interspersed with the fuel and the reactant channels. The cooling channels are formed using grooved metal plates to enhance the flow of the cooling fluid. One disadvantage of this approach is that in scaling up the fuel cell to achieve high output power, the cooling arrangement has to be re-designed every time the size of the cell changes.

An alternative approach described in the United State Patent Application Publication Number 2011/0229787 by Kozakai et al., published on Sep. 22, 2011, utilizes porous materials to construct the fluid flow fields, the GDL and the bipolar plates. Similar approach has been adopted in another U.S. Pat. No. 7,294,425, by Hodge et al, published on Nov.

13, 2007. Using porous materials for constructing the PEM device allows reducing the weight of the stack. At the same time, the micro-channels created in the porous material throughout the fluid flow fields and the GDL further facilitates better distribution of fluid in the fluid flow fields and improve the conversion efficiency.

Furthermore, a porous medium for the fluid flow region and the GDL allows heat transfer through latent heat. In another aspect, the porous design allows the water generated during the electrochemical reaction to evaporate and mix with the reactant gas to keep the fuel cell hydrated which is very important for the proper functioning of the fuel cell. In this approach, thermal management is scaled to some extent with the size of the fuel cell. However, full scalability is still a challenge.

In the U.S. Pat. No. 8,026,020 issued on Sep. 27, 2011, U.S. Pat. No. 8,192,889 issued on Jun. 5, 2012, and U.S. Pat. No. 8,597,846 issued on Dec. 3, 2013, Spink et al, describe a combination of porous electrode layer and a ceramic or metal coated ceramic GDL to reduce the overall weight of the PEM fuel cell stack and improve the fluid flow at the same time. In addition, different cooling arrangement including a variable size cooling structure has been described to enhance the heat dissipation and thereby improving the efficiency of the electrochemical reaction.

In the U.S. Pat. No. 8,277,996, issued on Oct. 10, 2012, Okusawa et al described a combination of porous bipolar plate integrated with a two-layer cooling flow fields for better conversion efficiency in a fuel cell stack. Special design features for the fluid flow channels combined with integrated cooling fluid channels have been suggested for improving fluid flow. For example, in the Chinese Patent Number CN 111477907A, issued on Jul. 31, 2020 to the inventors from the Jiao Tong University Shanghai, a three-layer bipolar plate where the third layer of the bipolar plate is designed to have groves and ridges on the cathode side of the bipolar plate to improve the fluid flow of the reactant. A similar approach is described in the United States Patent Application Publication Number 2008/0138670 published on Jun. 12, 2008, by Johnston et al, where cooling channels are provided to have direct contact with the fluid flow channels for improving cooling and efficient flow of the cooling fluids.

In an alternate approach described in the U.S. Pat. No. 8,741,500 issued on Jun. 3, 2014 to Fujita et al, a fuel cell array with a gap between adjacent fuel cell units in one layer is arranged orthogonally with a similar second fuel cell array in an adjacent layer. The gap in one array overlaps with the gap in the adjacent orthogonally arranged array at least partially, to create columns of contiguous gap for efficient cooling of the 3-D stack to improve power density. The stack may additionally be constructed on a cooling substrate with additional channels to circulate cooling fluid.

In a different approach described in the U.S. Pat. No. 7,335,436, issued on Feb. 26, 2008, to Kim et al, fluid flow fields are arranged in an orthogonal manner to facilitate more uniform fluid flow to prevent large pressure drop in the stack. Special serpentine design of the reactant flow region further improves the fluid flow.

For better conversion efficiency, design variations to improve the fluid flow are suggested. For example, in the U.S. Pat. No. 9,761,895, issued on Sep. 12, 2017, Takahashi et al, suggested uniform fluid pressure distribution using a fluid feed arrangement for the stack to reduce the fluid pressure gradient between the center and the extremities of the stack.

In order to improve conversion efficiency, PEM fuel cell in alternative geometrical form have been constructed. For example, in the United States Patent Application Publication Number 2004/0096718, published by Gomez on May 20, 2004, a tubular PEM fuel cell has been described. The tubular design includes a PEM constructed of a semiconductor material to facilitate electron transfer for higher output power. The fluid flow regions are conical in shape and are stacked and separated to allow only positive or negative ions to flow in a given section. The segmented section may also be constructed in different geometrical shapes.

Keeping with the cylindrical geometry, a wrap-around spiral geometry PEM fuel cell is described in the U.S. Pat. No. 6,063,517, issued on May 16, 2000 to Montemayor et al. The basic PEM fuel cell is constructed as a long flat tubular structure similar to a flat geometry fuel cell described earlier. More specifically, the anode is constructed of a hollow flexible corrugated stainless-steel tube to flow the fuel in the tube, The entire flexible anode is encapsulated and sealed inside a PEM membrane. The cathode is also constructed of a flexible corrugated stainless-steel tube that encloses the encapsulated anode such that the reactant fluid flowing in the cathodic tube is in contact with the PEM from the other side of the anode. A metallic electrode is in contact with the cathode from outside that serves as the current conducting element.

The long tubular structure is wrapped around a central cylindrical mandrel. The cylindrical mandrel also provides the structural support to the inlets and outlets for the electrochemical reaction fluids as well as for the cooling fluid. The spiral geometry bipolar plate design is also described in a more recent Chinese Patent Number CN 112038657 A issued on Dec. 4, 2020, to the inventors from the Xian Thermal Power Research. While these prior art solutions describe an alternate to the flat geometry, the bipolar plate is still an essential design element.

In this invention, I propose a new flexible PEM fuel cell design that may be adapted for different mechanical mounting support structure or may be a self-supporting, three-dimensional structure depending upon the output power requirement. The fluid flow regions of the PEM fuel cell according to this invention includes a porous mesh to improve diffusion and distribution of the fluid flow to achieve more uniform distribution of the reacting species for more efficient electrochemical reaction throughout the volume of the fuel cell.

The current collection is facilitated by sealed electrodes that are in close proximity to PEM where the electrochemical reaction takes place. The electrical design of the fuel cell as described in this invention essentially eliminates the need for the bipolar plates that are central to many apparently similar prior art devices. The thermal management aspects of the stackable PEM fuel cell according to this design is completely external and independent of the core design of the fuel cell stack. This particular aspect of the design allows the fuel cell stack to be modularly scalable, for higher output power without having to re-design the core of the fuel cell.

BRIEF SUMMARY OF THE INVENTION

One aspect of the invention is that the entire PEM fuel cell structure is constructed of layers of flexible materials aligned parallel along their broadside surfaces More specifically, the PEM is mounted on a non-permeable support layer including a semi-permeable PEM (collectively, a separator layer), and sealed between two non-permeable end layers along the periphery thereby creating sealed fluid flow regions (fluid channels, hereinafter) one on either side of the PEM. A fuel flows in one channel, and a reactant fluid flows in the channel on the opposite side of the PEM. The fuel and the reactant are maintained in close proximity of the PEM to facilitate an electrochemical reaction between the fuel and the reactant across the PEM. The channels sharing a common PEM on the opposite sides of the PEM are typically of opposite polarity. Optional gas diffusion layer (GDL) embedded with the PEM further improves the diffusion and therefore, the interaction between the fuel and the reactant across the PEM.

In another aspect of the invention, the efficiency of the electrochemical reaction is further improved by including a porous material (a mesh hereinafter) in the channels to facilitate uniform flow and efficient diffusion of the reacting species to the PEM. The mesh material acts like a diffusion facilitator to increase the effective surface area for efficient electrochemical reaction in the immediate vicinity of the PEM. The independently sealed channels for carrying the fuel and the reactant each have independent inlet ports to supply the respective fluids, and independent outlet ports to dispose the unused fuel and the reactant, respectively.

One important design feature of the PEM fuel cell according to this invention is the flexible current collecting layers that are sealed within the channels located in close proximity to the surfaces where the electrochemical reaction takes place. The electrodes attached to these current collecting layers are sealed within the respective channels and are accessible externally to connect to an external load. The electrical design of the fuel cell completely eliminates the need for the current collection plates (bipolar or unipolar) that are essential elements of the large variety of the prior art PEM fuel cell described in the previous section. Thus, the PEM fuel cell according to this invention is very compact, flexible, and light weight for modularly stacking in large numbers to increase the output power.

The flexible design of the PEM fuel cell structure is adaptable for scaling up the output power by simply adding more separator layers in a modular flat stack, thereby creating more channels without having to add any bipolar plates, unlike in most prior art devices described earlier. Each fluid channel in a stacked structure has one or more independent inlet port(s) and at least one or more independent outlet port(s) for better fluid distribution as needed, depending upon the size of the channels. The output power requirement determines the number of separator layers, and the thermal management means for heat dissipation. Furthermore, the thermal management means is kept completely external to the fuel cell stack for modular scalability.

In another aspect of the invention, a contiguous flexible PEM fuel cell having multiple channels is wrapped over on to itself in a self-supporting 3-dimensional stack of a desired geometrical form (e,g, a rectangular, elliptical or cylindrical form). This approach effectively adds more channels to the stack without having to add any bipolar plates. The output power requirement determines the size of the contiguous flexible stack and therefore the size of the 3-dimensional stack, and the thermal management means for heat dissipation. Alternately, the contiguous fuel cell is wrapped over on a central mandrel of a desired shape and thickness, for example, a rectangular, elliptical or a cylindrical mandrel of a desired thickness.

In a preferred embodiment, the central mandrel is a thin plate for lightweight fuel cells and stacks depending upon thermal management capability desired for a particular output power requirement. The central mandrel also serves as a support structure for one or more fluid inlet and outlet ports, as well as a cooling element for better thermal management. The central mandrel further includes distributed cooling tubes.

One important aspect of the wrapped over design is easy adaptability for modular stacking of small individual wrapped over fuel cell units in arrays (array stack hereinafter) The array stack is arranged in one, two or three-dimensions) for overall higher output power. In another aspect of the design, multiple external surfaces of the individual cell units are available to provide efficient cooling by using one of many cooling techniques known in the art, e.g., forced air cooling, cooling plates, a circulating cooling fluid, or some combination of the above, as needed for the size of the stack. In another aspect of the invention, one or more cooling devices are shared between multiple wrapped over fuel cell units, and are scalable according to the size of the array stack. In yet another aspect, cooling fluid channels with inlet and outlet ports are created between the adjacent fuel cell units in a stack. One advantage of all external cooling is that the entire cooling system is also scalable without having to alter the core design of the fuel cell as in some prior art constructions where cooling mechanism is integrated in to the core design of the fuel cell.

The self-supported wrap-over structure is constructed mainly of polymer and therefore, has very low weight, thereby making the design attractive for applications that require easy transportability (e.g., as a fuel source in an automobile). The proposed fuel cell design according to this invention is adaptable for different types of fuels and reactants, including the conventional fluid fuels such as, hydrogen or hydrogen reformates, and reactants, like oxygen or air, respectively. The byproduct of the PEM fuel cell is water which is easily disposed of in many different ways including gravity drain or pumping it out of the fuel cell. While the principles are outlined using a conventional PEM fuel cell, the design are easily adaptable for other types of polymer electrolytic fuel cells (PEFC), alkaline fuel cells (AFC), phosphoric acid fuel cells (PAFC), molten carbonate fuel cells (MCFC) and solid oxide fuel cells (SOFC) and other sub-categories of these exemplary fuel cells.

BRIEF DESCRIPTION OF THE DRAWINGS

Other aspects, features, and advantages of the present invention will become clear from the following detailed description, the appended claims, and the accompanying drawings in which:

DETAILED DESCRIPTION OF THE INVENTION

Principles of the invention are explained using the following description in the context of the figures of the drawings. Identical elements and elements providing similar functionality in the figures are represented by same reference numerals in various schematic views as much as possible. Different drawing figures focus on one or more different concepts of the invention. If an element is not shown or labelled in any particular drawing figure for clarity and ease of illustration, it is not be construed as precluded from the embodiment, unless stated otherwise. Different features shown in different embodiments of the invention may be practiced alone, or in a desirable combination to utilize the full scope of the invention.

Figure 1:
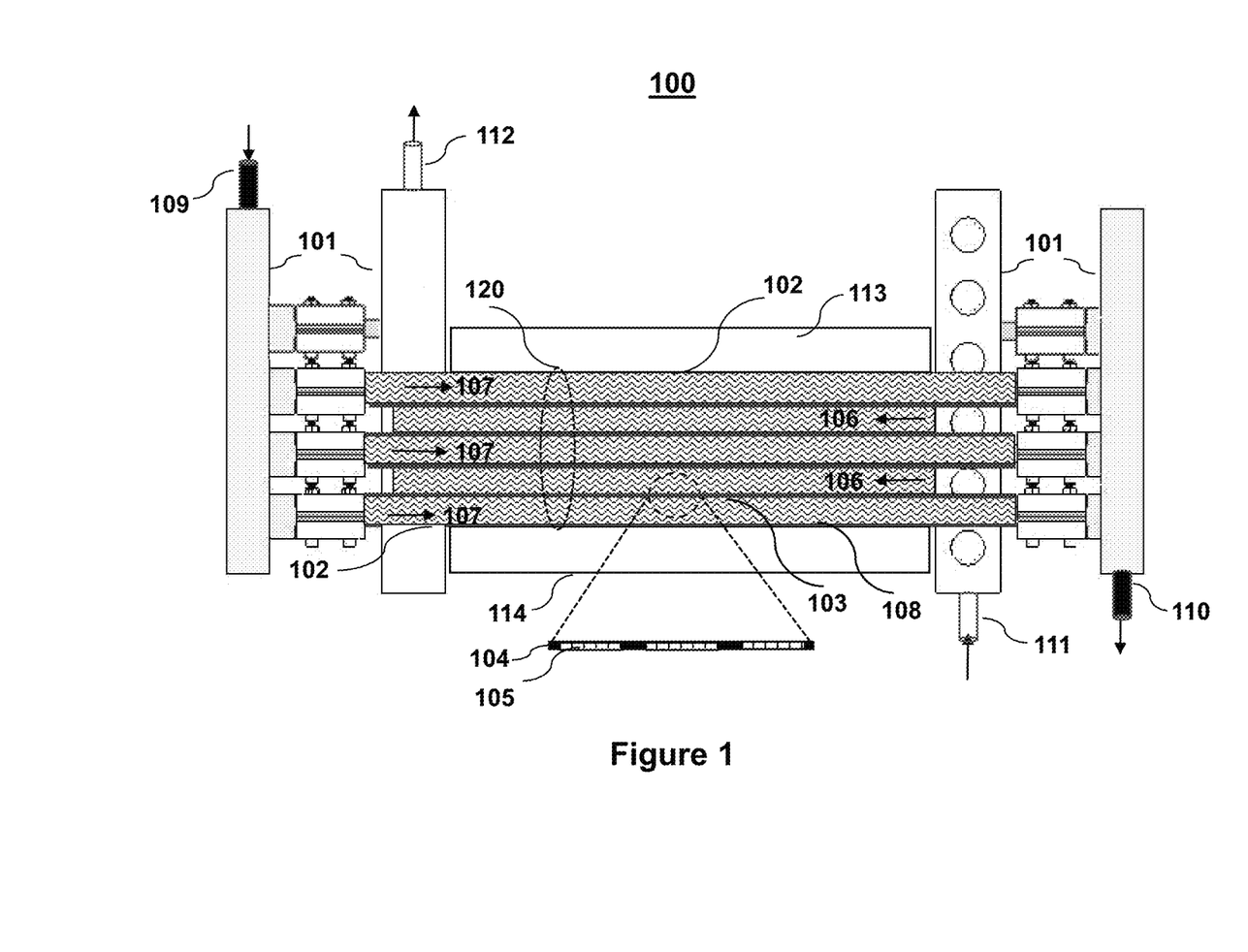
FIG. 1 is a schematic cross-sectional view to show the concept design of a proposed PEM fuel cell stack.

By way of example and not as a limitation, the basic concepts of the invention are illustrated using a most common Proton Exchange Membrane (PEM) fuel cell. In one embodiment of the invention shown in FIG. 1, a schematic cross-sectional view 100 of the fuel cell illustrates the design of an exemplary PEM fuel cell. In particular, FIG. 1 shows a mechanical support frame 101 to clamp a plurality of fuel cell elements in a stack 120 (collectively shown as a dashed oval) which will be descried shortly. In this illustrative example, the fuel cell elements are clamped in the mechanical frame in a flat geometry. Although a simple rectangular frame is shown for simplicity, any other shape of the frame may be used. The mechanical frame is designed according to the specific application. However, other geometries that may be apparent to those skilled in the art are within the scope of the general description of the invention.

Besides supporting the fuel cell elements, the mechanical frame may be used for multiple other functions, that includes integrating the fuel delivery system, the cooling fluid delivery system, and one or more outlets for draining the reaction byproducts, e,g water in this exemplary PEM fuel cell. For clarity, other aspects are described later in reference with other embodiments. In addition, the mechanical frame also supports the external cooling plates 113 and 114 on top and bottom of the stack, respectively. Depending on the thermal management requirements, any cooling methods such as forced air cooling or using a cooling fluid known in the art may be used. The cooling plates may further include cooling tubes with inlet and outlet ports (shown in other embodiments) to circulate a cooling fluid. The inlet and outlet ports for the cooling fluid may also be integrated with the mechanical frame. The design aspects of the mechanical frame are more of a generic nature and will not be described further, as it will be apparent to those skilled in the art.

The PEM fuel cell according to this invention comprises a stack of flexible polymer electrolyte layers (polymer layers hereinafter for brevity). The polymer layers are aligned flat on the mechanical frame with their broadside surfaces aligned parallel in this example. The polymer layers 102 are non-permeable, whereas, the polymer layers 103 (shown as bold lines in FIG. 1) are composite layers including a non-permeable mounting layer and other embedded layers. The structure of the composite polymer layer 103 will be described shortly. The stack of flexible layers 102 and 103 are sealed along the periphery on all sides, thereby creating independent sealed channels 106 and 107 between the sealed polymer layers.

The non-permeable polymer layers 102 and the mounting layer in 103 must be chemically inert and electrically non-conducting. For example, the polymer layers 102 and the mounting layer in 103 are constructed of materials such as fiberglass embedded with a matrix of various polymers including, but not limited to, Poly-Tetra-Fluoro-Ethylene (PTFE or Teflon™), or other flexible composite polymeric materials and resins, such that the layers 102 and 103 are flexible. Any of the methods for sealing electrolyte membranes known in the art including, but not limited to, pressure sealing, pressure sealing with a sealing agent, sealing with adhesives that are chemically resistant to reactants in the channels, or a combination thereof may be used for sealing the polymer layers.

In this particular example, the polymer layers 102 terminate the stack at the bottom and top ends (hereinafter end layers), and the polymer layers 103 separate channels 106 and 107 within the stack (hereinafter separator layers). All layers of the separator layer are not shown in this view for the clarity of illustration. The mounting layer 104 in the separator layer 103 is non-permeable. The mounting layer 104 supports one or more semi-permeable regions 105 embedded therein as shown in the expanded view in the inset in FIG. 1. The semi-permeable regions further include a Proton Exchange Membrane (PEM) where the electrochemical reaction takes place.

The size of the semi-permeable region is an important factor that determines the volume of the species participating in the electrochemical reaction across the PEM, and therefore the output power'. Therefore, the size of the semi-permeable region proportional to the overall size (volume) of the fuel cell (fuel cell stack) is used as a design parameter for a desired output power requirement, and the thermal management requirement, commensurate with the output power requirement.

The channels 106 and 107 are set up for flowing a first and a second fluid, respectively, such that the fluids flowing in adjacent channels are not of the same kind. It is noted that the term 'fluid' is used in its generic sense to include gases and liquids hereinafter, unless stated otherwise. The electrochemical reaction is supported as long as the stack includes at least one channel 106 with the first fluid, and at least one channel 107 with the second fluid. The total number of channels of 106 and 107 and their arrangement are design parameters depending on the required output power, and is only limited by the overall thermal management capacity of the fuel cell (fuel cell stack).

The independent channels 106 are connected to independent input and output ports 109 and 110. Similarly, the independent channels 107 are connected to independent input and output ports 111 and 112. Fluid flow is set up through each channel between the respective input and output ports. While in this example all fuel channels 106 are shown to be connected to a common feedline, as a design choice, and in particular in a stack arrangement as shown in FIG. 1, different fuel channels may be set up with independent feedlines to manage the fuel flow in each channel separately. Similar design choices are available for the reactant channels 107 as well.

The fluids in channels 106 and adjacent channels 107 are a fuel and a reactant, respectively. It is immaterial which channel (106 or 107) is selected as the fuel channel as long as the adjacent one is set up as the reactant channel, such that a channel with fuel has an adjacent channel with a reactant. In this illustrative example, channels 106 and 107 are fuel and reactant channels, respectively, and a fuel channel has an adjacent reactant channel on both sides. The fuel and the reactant in the respective channels are in physical contact with the PEM embedded in the separator layer 103, such that the electrochemical reaction takes place through ion exchange at the PEM layer.

Fuel for PEM fuel cells is typically hydrogen. However, a mixture of hydrogen with a reformate gas may also be used. For example, gases such as methane, propane, methyl alcohol, ethyl alcohol, gasoline, ammonia, that generate hydrogen as a product of reforming process are also used as fuels. The reactant is typically oxygen, but air or air enriched with oxygen are other possible reactants. While the principles are explained using gaseous fuels and reactants, the design works well with liquid fuels and reactants as well.

While there is no restriction in setting up the fuel and the reactants to flow in the same or opposite directions in the channels, in this preferred embodiment, the respective input and output ports for the channels 106 and 107 are set up on the opposite sides of the stack such that the direction of fuel flow in channels 106 is in the opposite direction of the reactant flow in channels 107. This preference has a distinct advantage in optimally controlling the concentration of the fuel and reactant molecules at the PEM for a uniform reaction rate throughout the volume of the fuel cell.

More specifically, the fuel channel near the respective inlet port has a higher concentration of fuel molecules but the rate of reaction at that end is controlled by the lower concentration of the reactant molecules exiting on the same end of the channel, and vice versa. Therefore, optimizing the fluid pressure at the respective inlet ends of the fuel and reactant channels allows the desired concentration of the reacting species to be maintained throughout the extent of the channels. As a result, the rate of electrochemical reaction and therefore, the efficiency of energy conversion is optimally controlled. This particular arrangement is also optimal for better thermal management, and therefore more suitable for modularly stacking the fuel cells as will be described later.

In the exemplary PEM fuel cell described here, the electrochemical reaction generates water as a product. In most cases, water vapor is carried away with the fluid and reactants to the respective outlet ports (110 and 112). However, excess water if any collected at the bottom of the fuel cell, is drained out by gravity draining or suction through drainage tube (not shown in this view). Gravity draining is enabled by proper mounting of the cell. This is particularly applicable for high output power application, and certain other types of operation and/or in systems where high volume of fuel and reactants are provided in the channels 106 and 107, respectively, in a continuous flow.

In a preferred embodiment, the channels 106 and 107 further include a spacer layer 108 (sealed inside the channels). The spacer layer comprises a porous mesh to open up, or increase the space in the channels 106 and 107 for efficient flow of the fluids through the channels and enhance the diffusion and distribution of the reactants to the embedded PEM layers. The porous mesh is constructed from a wide range of materials including stainless steel, anodized copper, nickel, and polymers embedded with metal particles or foams of metals. Alternately, non-metallic medium including, carbon fibers with claddings of thermally conducting polymers and nanoparticles, thermally conducting non-metallic materials are equally suitable for this purpose.

As noted earlier in the Background Art section, the bipolar plate(s) is an essential element for current collection and mechanical integrity in most designs of the prior art fuel cells. Importantly, one aspect of the electrical design of the fuel cell according to this invention is the absence of the bipolar plate(s). More specifically, there are no bipolar plates in the stack 120 for current collection or for mechanical integrity. Instead, the polymer layers (102 and 103), and therefore the fuel and reactant channels 106 and 107, respectively, in the entire stack are independently supported in the mechanical frame.

It can be appreciated by a person having ordinary skill in the art, that the size of the stack is expanded by simply adding more separator layers (103) between the end layers 102 in the stack as needed, to increase the number of channels, and therefore the active area of the electrochemical reaction, for higher output power. In contrast, adding more channels to an apparently similar prior art construction means adding one or more MEA, fluid flow regions and bipolar plates (unipolar plate for stack extremity). The capability of expanding the stack without having to add an equal number of bipolar plates with each additional separator layer, has a major advantage in limiting the weight and the volume of fuel cell stack for application where ease of portability is important.

Elimination of the bipolar plates is enabled by the electrical design of the current conducting layers embedded in the channels 106 and 107. This particular aspect is quite different from the prior art devices, despite the fact that most prior art devices use a MEA which is bipolar, meaning it has opposite electrical polarity on its opposite surfaces. According to the principles of this invention, respective anodic and cathodic current conducting layers are embedded in the sealed fuel and reactant channels 106 and 107, respectively. The current conducting layers are in physical and electrical contact with respective sealed electrodes that are accessible externally to complete an electrical circuit through an external load. In a preferred implementation, the current conducting layers are constructed of thin metallic mesh and are flexible enough to conform to the physical shape of the channels 106 and 107. The metallic mesh is optionally coated with a noble metal to reduce the electrical resistance. This aspect will be described in further detail later in reference to another embodiment.

Typically, the electrode in contact with the fuel channel (106) is the anode and the electrode in contact with the reactant channel (107) is the cathode. Therefore, the fuel and the reactant channels are often called the anodic and the cathodic channels, respectively, depending upon the polarity of the ions they contribute to the electrochemical reaction. Current generated through the electrochemical reaction flows in an external load connected between the anode and the cathode. The electrodes connected to the respective channels of the stack are electrically isolated from the electrodes in the adjacent channels, thereby allowing the flexibility in externally connecting them as needed in a circuit for different applications.

It is noted that the arrangement of the channels as shown in FIG. 1 is not the only option in a stack of fuel cells. For example, in the fuel cell stack described in reference with FIG. 1, anodic channel 106 is shared between two cathodic channels (107), one on either side. However, a fuel cell stack may also be constructed with a fuel channel and a reactant channel only on one side of it. Some exemplary alternate design concepts will be described in later embodiments. It should be understood that all such variations that are apparent to those skilled in the art are within the scope of this invention.

The design of the fuel cell using flexible material enables other ways of providing mechanical integrity than a rigid flat geometry described in reference to FIG. 1. In another embodiment shown in FIG. 2, the schematic 200 shows a self-supporting three-dimensional (3-dimensional) structure to create a stack of multiple fuel and reactant channels from a single contiguous fuel cell stack 220 in an alternative way. The contiguous fuel cell stack 220 is constructed in a similar way as the stack 120 shown in FIG. 1, and the description pertaining to that embodiment is applicable to the stack 220 as well. The differences are described next.

Figure 2:
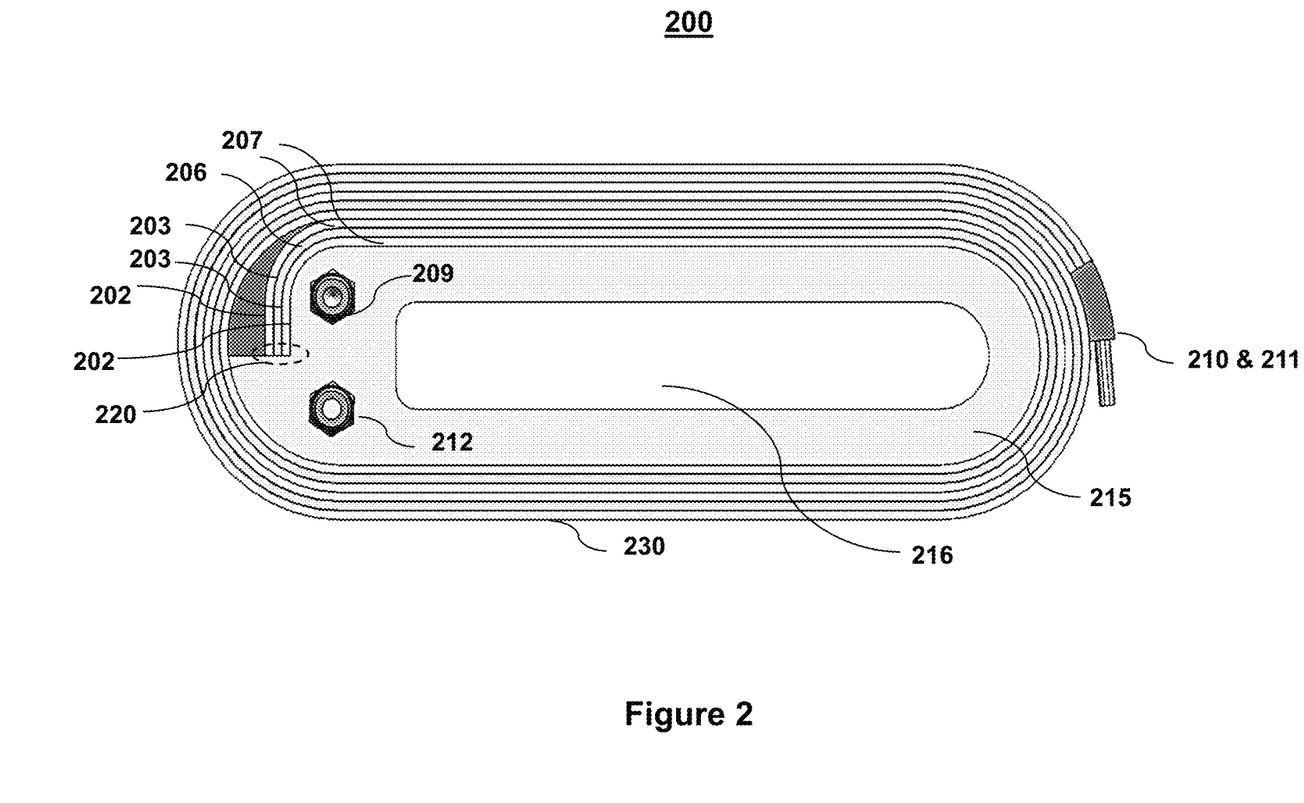
FIG. 2 is a schematic view of an embodiment of a self-supporting folded or wrapped over PEM fuel cell.

More specifically, the two end-layers 202 are sealed with the two separator layers 203 in between, to form one fuel channel 106 and two reactant channels 107, one on each side of the fuel channel 106. However, adding more separator layers to increase the number of fuel and reactant channels for achieving higher output power is not precluded, as long as each additional fuel channel has a reactant channel adjacent to it. One other difference between the stack 220 and 120 in FIG. 1, is that instead of building up the stack by adding more separator layers on an external mechanical frame 101 (FIG. 1) to create additional independent fuel and reactant channels as described earlier in the context of FIG. 1, multiple layers of fuel and reactant channels are created by wrapping over (or folding over) a single contiguous stack 220 on to itself in one or more turns, thereby effectively building a self-supporting 3-dimensional multi-stack 230.

Importantly, the 3-dimensional multi-stack 230 does not require bipolar plates in between the wrapped-over layers. It can be fully appreciated that eliminating the bipolar plates in the contiguous stack 220 allows it to retain flexibility, and enables it to be wrapped over for a desired number of turns to obtain a required output power. The 3-dimensional form may be created in a standard geometrical shape, including rectangular, elliptical or cylindrical form, or may be made to conform to the shape of a specified equipment or device it is intended to be used for. The size and the number of turns of the multi-stack is determined by the output power requirement and in turn dictates the physical dimensions and the number of channels of the contiguous stack 220. The entire wrapped over stack 230 is typically deployed with appropriate external cooling devices (not shown for clarity) for thermal management.

Alternately, in a preferred implementation of the design shown in FIG. 2, the stack 220 is wrapped over a central rectangular plate 215 that also supports the inlet and outlet ports of the wrapped over structure. In this particular illustration, the inlet port 209 for one channel and the outlet port 212 for the other channel are supported on the central mandrel, whereas the outlet port 210 for the one channel and the inlet port 211 for the other channel are located on the opposite end of the wrapped over structure and supported on the 3-dimensional wrapped over structure 230, respectively, such that the fuel and reactant flows are set up in the opposite directions for the reasons described earlier in reference to FIG. 1. However, as a design choice, the inlet and outlet ports may be constructed such that the fuel and the reactant flows are set up in the same direction.

As a design choice, the central plate in close contact with the entire surface of the fuel cell stack may be a solid object. In this embodiment, one variation of the central plate 215 has a hollow center 216 for forced air cooling. Other cooling methods for example, embedding cooling tubes in the central plate is also an option and will be described in another embodiment later. These and other cooling techniques are well known in the art and will not be described further. It is noted that only external cooling methods are used such that the core design of the contiguous fuel cell stack need not be altered while scaling up the size of the stack 230.

Figure 3:
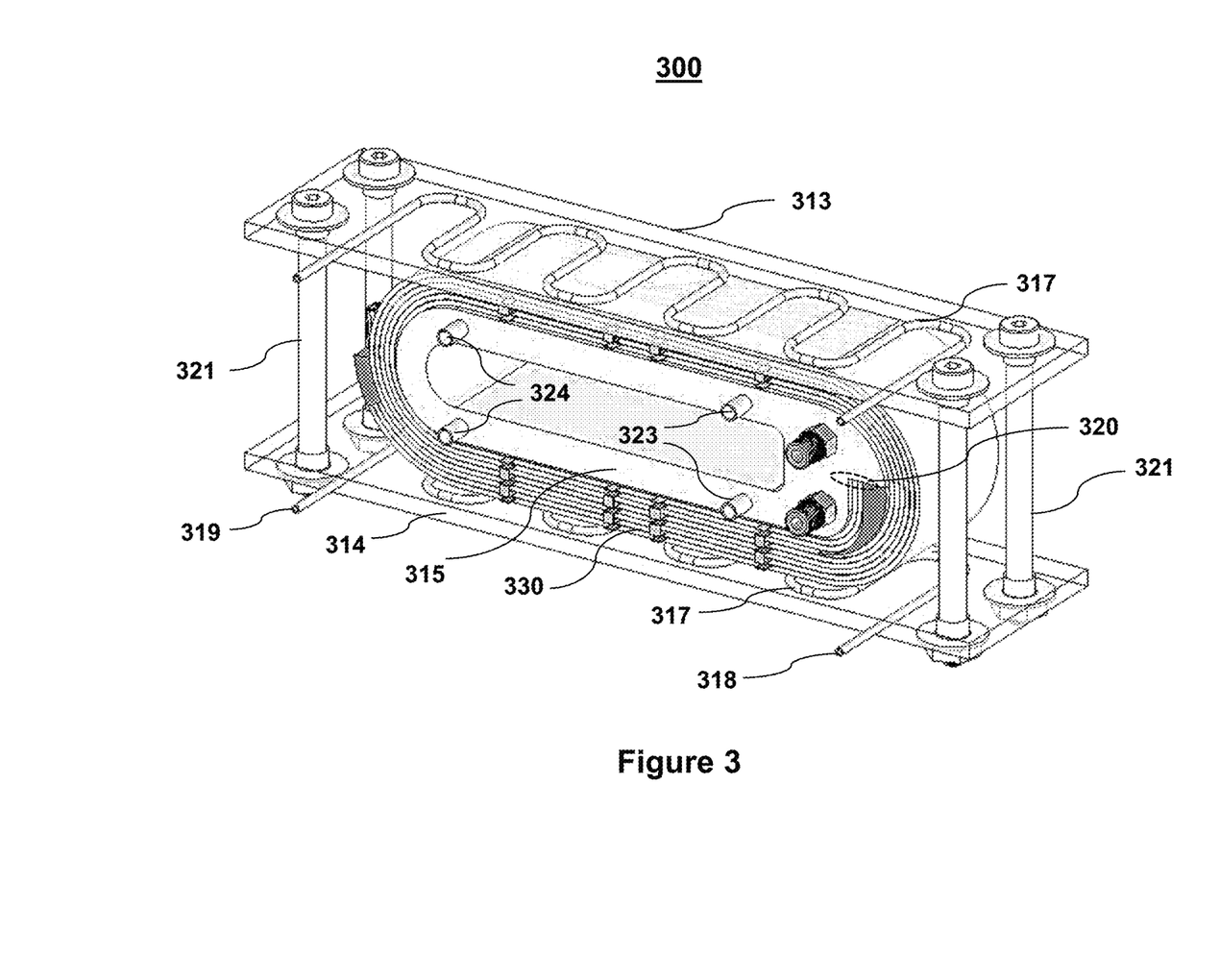
FIG. 3 is a schematic representation of a wrapped over PEM fuel cell supported with a mechanical scaffolding to provide external cooling.

External cooling may also be provided by one or more other means to a wrapped over fuel cell stack as shown in FIG. 3. This embodiment particularly highlights some of the concepts of thermal management that may be implemented with the fuel cell stack. In the schematic view 300, the wrapped over fuel cell stack 330 is identical in all respects to the stack 230 shown in previous FIG. 2. Each and every feature common with the previous embodiments not labelled again, should not be construed as absent. For clarity, only the features that are introduced new in this embodiment are labelled.

In this illustrative example, the wrapped over fuel cell stack 330 is mounted between two flat cooling plates 313 and 314 that are in physical and thermal contact with the top and bottom surfaces of the entire fuel cell stack 330, respectively. The cooling plates 313 and 314 are supported on a separate mechanical frame 321. The cooling plates may have optional cooling tubes 317 embedded therein for circulating a cooling fluid through the inlet and outlet ports 318 and 319, only one set with the bottom cooling plate 314 is shown for clarity. It is noted that the cooling plates shown in this example is only for illustrative purpose and not as a limitation. Other arrangements are equally viable.

One additional feature of the central rectangular plate is shown in this embodiment. Cooling cavities or tubes (not visible in the drawing figure) are embedded in the central plate 315 for circulating a cooling fluid between the inlet and outlet ports 323 and 324, respectively. Any cooling fluids widely known in the art including air, gases or liquid coolants may be used. Thus, the fuel cell stack 330 according to this invention is cooled entirely by external means, unlike some prior art devices that have the cooling tubes embedded in the fluid flow channels. Advantageously, complete external cooling allows flexibility in modular expansion of the fuel cell stack for higher output power without having to redesign the core of the fuel cell stack to embed additional cooling elements as has been advocated in some prior art devices.

Figure 4:
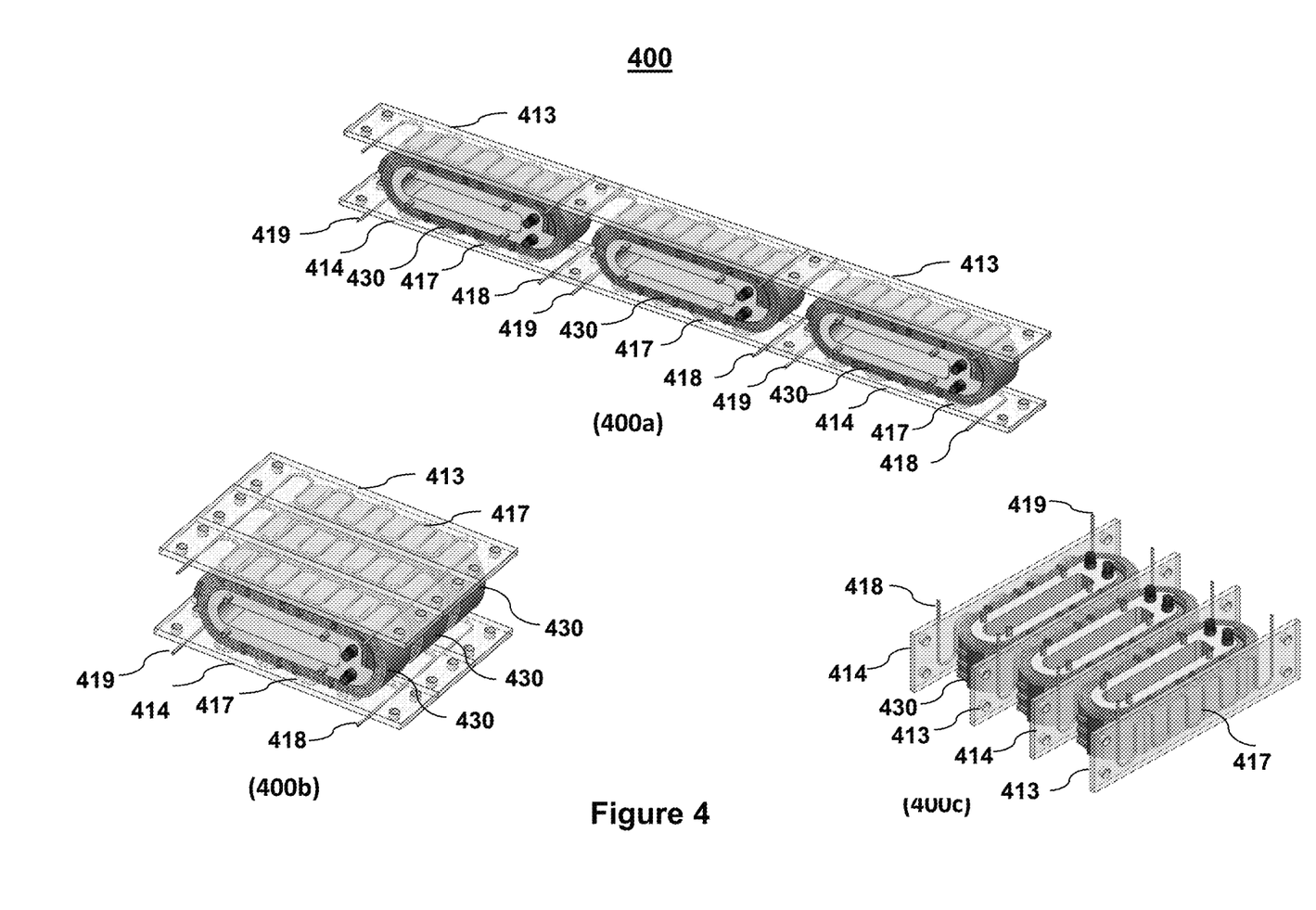
FIG. 4 is a schematic view of linear arrays of PEM fuel cells.

In FIG. 4, the schematic view 400 shows a few preferred illustrative examples to practice modular expansion of the wrapped over fuel cell stack to achieve high output power without altering the core design and structure of the basic wrapped over fuel cell stack 430. In one preferred arrangement 400a, multiple wrapped over fuel cell stacks 430 (only three shown for clarity), each with a respective set of cooling plates 413 and 414, are arranged in a linear array. The descriptions of the constructions of the fuel cells and the cooling plates described earlier in the context of FIG. 1, FIG. 2 and FIG. 3, are applicable in its entirety, and will not be repeated. The cooling tubes 417 may have separate feed lines or, may be interconnected serially to a shared feed line for the cooling fluid. Other design options for cooling requirements depends upon the size and arrangement of the entire array. Such cooling arrangements will be apparent to a person of ordinary skill in the art, and are within the scope of this invention.

In a second preferred arrangement 400b, multiple fuel cell stack 430 are arranged in parallel on the sides. The entire arrangement shares a common cooling plate 413 and 414 with a contiguous embedded cooling tube 417 and input and output ports 418 and 419, respectively for circulating the cooling fluid. Alternatively, the cooling plates for each fuel cell stack 430 in FIG. 4 can be all independent, with respective cooling fluid feeds. Other variations of cooling arrangements that may occur to a person ordinarily skilled in the art are within the scope of the description of these exemplary embodiments.

In another preferred arrangement 400c, the multiple fuel cell stack 430 (only one labelled for clarity) are arranged such that the cooling plates are shared between the adjacent fuel cell stacks. It can be well appreciated by a person ordinarily skilled in the art, that numerous arrangements can be implemented to solve the purpose of thermal management in a stack of wrapped over fuel cells depending upon the total number required to generate a desired output power. It can be further appreciated that the examples of one-dimensional (linear) stacks can be modularly expanded to two- and even-three dimensional stacks.

One advantage of the wrapped over stack of fuel cells is that the size of the wrapped over fuel cell may be altered without having to change the basic design. Furthermore, any number of these fuel cells may be used as building blocks for modular expansion of the stack to obtain a desired output power. The fluid flow and thermal management may also be expanded modularly without having to modify the core design of the building blocks, and the fluid pressure management across the higher dimension stack arrays. The electrical connectivity between the building blocks is also a design choice depending upon the application and output power requirements.

Figure 5:
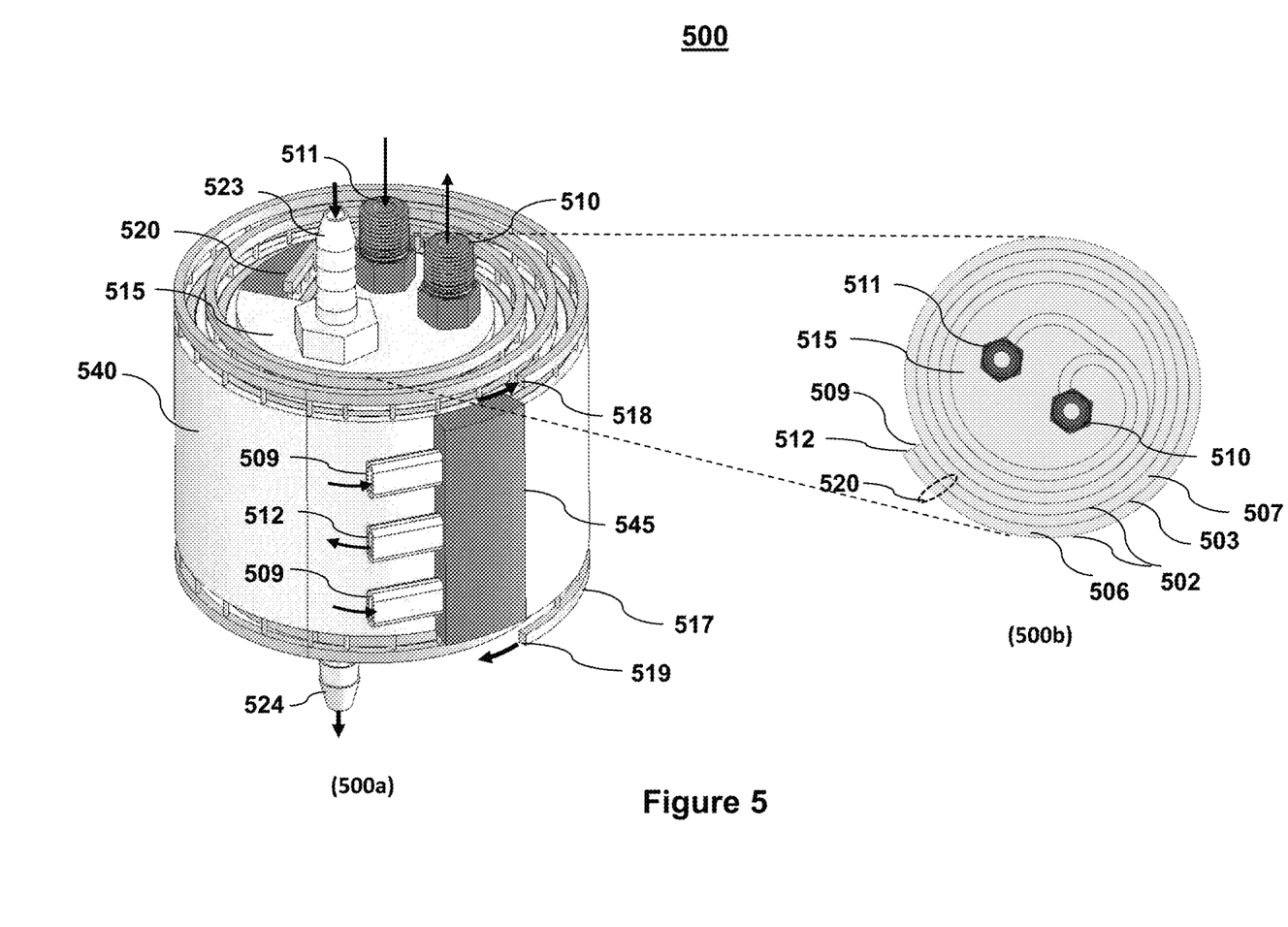
FIG. 5 is a schematic view of a wrapped over PEM fuel cell supported on a cylindrical mandrel.

The basic concept of the wrapped over self-supporting structure can also be extended to other geometrical forms. FIG. 5 shows an embodiment which is a cylindrical geometry counterpart of the wrapped over fuel cell stack shown in FIG. 3. The description pertaining to the embodiment shown in FIG. 3 is applicable to this geometry as well and details will not be repeated. Elements with similar functionalities are represented by the same reference numerals. In this embodiment the contiguous fuel cell stack 520 not fully visible in the view 500a, may be wrapped over on to itself in one or more turns to create a self-supporting 3-dimensional structure, similar to the rectangular counterpart colletively described in reference with FIG. 2 and FIG. 3. That description is entirely applicable and will not be repeated.

As a preferred design choice shown in this embodiment, the contiguous fuel cell stack 520 is wrapped over a central cylindrical mandrel 515 in several turns. The cylindrical mandrel is constructed of a material having good thermal conductivity such as aluminum, copper, stainless steel, etc. The central mandrel has a similar function as the rectangular plate 315 described in the context of FIG. 3. The central mandrel provides support to contiguous fuel cell stack 520 including the fluid inlet and outlet ports 511 and 510, respectively (dark arrows indicating the flow direction). The other set of inlet and outlet ports 509 and 512 are supported on a termination end 545 of the outer jacket 540 that may also serve as a cooling means in this embodiment.

A schematic cross-sectional view of the inside of the contiguous fuel cell stack 520 is shown in the inset view 500b. The fluid channels 506 and 507 are formed between the two sealed flexible polymer layers 502 and a separator layer 503, respectively. In this particular example the contiguous fuel cell stack 520 includes only one fuel channel and only one reactant channel on one side of the fuel channel. However, adding more layers to the contiguous fuel cell stack 520 similar to that shown in FIG. 3, is not precluded. Similar variations apparent to a person skilled in the art, are within the scope of this invention. It is noted that the channels are wrapped over several times on itself, with no bipolar plates (or separate anode and cathode plates). This is a key design feature which is substantially different from the wrap-around geometry devices described earlier for the prior art construction in the Background Art section.

The thermal management means for the cylindrical structure are similar to the one described in the context of the rectangular geometry embodiment in FIG. 3. More specifically, central mandrel includes a cooling tube embedded therein (not visible in this view) with inlet and outlet ports 523 and 524, respectively, to circulate a cooling fluid. The cooling jacket 540 which runs along with the channels includes a contiguous cooling tube 517 embedded therein with inlet and outlet ports 518 and 519, respectively, to circulate a cooling fluid. The terminal end of the cooling jacket also supports the fluid inlet ports 509 and a fluid outlet port 512, respectively. The details of the cooling arrangement are only for illustrative purpose and not as limitations.

Figure 6:
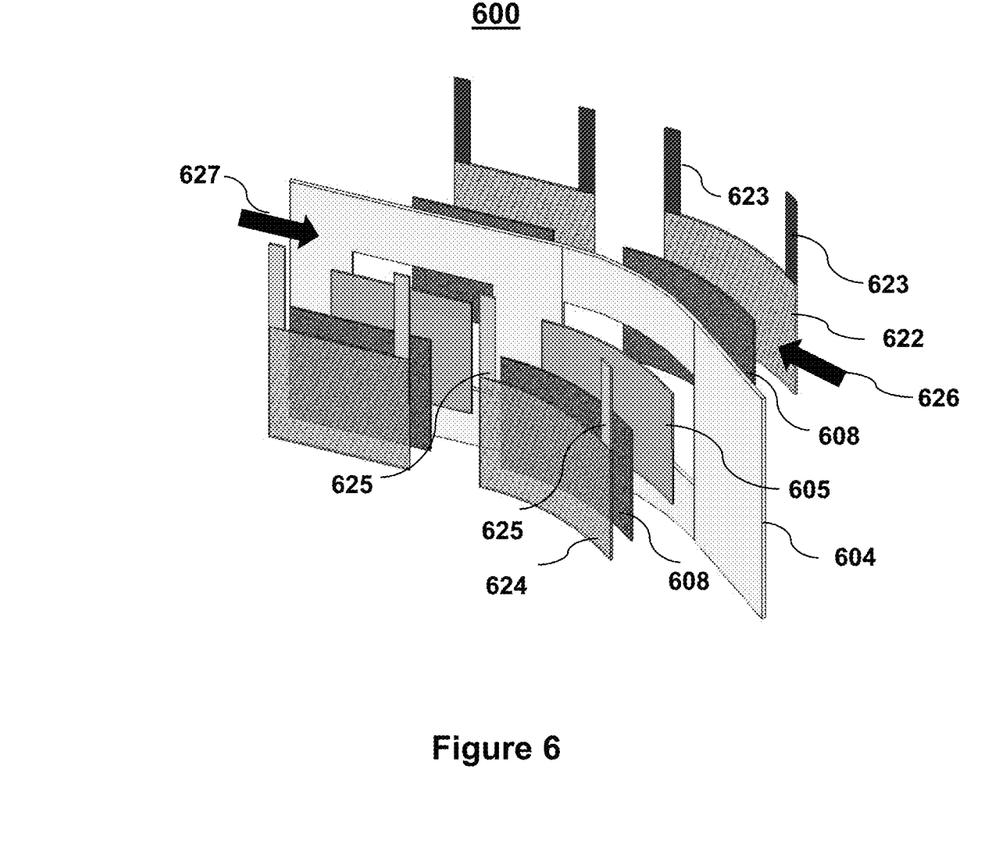
FIG. 6 is a schematic view of the details of the interior of an embodiment of a PEM fuel cell.

Referring now to FIG. 6, it schematically shows the details of the interior section of a wrapped over fuel cell. While the schematic 600 is shown as a section of the cylindrical geometry embodiment, the same interior structure is applicable for the rectangular geometry and flat geometry embodiments shown in FIGS. 2-4, and FIG. 1, respectively. More specifically, the fuel cell in this exemplary embodiment comprises multiple independent segments (only two segments shown for clarity) that are created of a contiguous separator layer 603. The flexible layers (equivalent of 502 in FIG. 5) bounding the fluid channels on the distal sides of the separator layer are not shown in this view for clarity. However, those layers are not precluded.

The separator layer includes a contiguous non-permeable mounting layer 604 with multiple sections of semi-permeable regions including the PEM layers 605 embedded therein. For clarity, the individual layers are shown with an offset. In practice, they are in close contact or bonded with each other. The size of the semi-permeable region is a design parameter to be selected for a desired output power requirement, and the thermal management requirement commensurate with the output power requirement. The PEM sections are optionally coated with catalytic material(s) to improve the efficiency of ion exchange across the PEM. The fuel and the reactant channels are located on the opposite sides of the PEM layer in the semi-permeable regions 605. The thick arrows 626 and 627 indicate the flow directions of the two fluids.

Next to the PEM sections, the elements 608 form the Gas Diffusion Layers (GDLs) that enhance the diffusion and distribution of ions to the PEM sections. The GDL is optional and may not be necessary depending upon the application. The GDL can be constructed of a flexible metallic or a non-metallic porous material. Separate flexible current conducting layers 622 and 624 of a high conductivity material, preferably a fine metal mesh is disposed in the fluid channels between the GDL and the flexible layers bounding the fluid channels (equivalent of 502 in FIG. 5, not shown in this view for clarity). For clarity, only one set of current conducting layers is labeled.

In a preferred implementation, the sections 622 and 624 are further coated with a noble metal to reduce contact resistance of these layers. The sections 622 and 624 are the current transport layers connected to a respective pair of sealed electrodes 623 and 625 that are externally accessible. The electrical design feature of embedded current conducting layers and sealed electrodes is particularly important in eliminating the separate current conducting bipolar plates (or unipolar plates at the stack extremities). Advantageously, with the electrical design of the current conducting layers and electrode structures according to this invention, different sections of the fuel cell can be externally connected in different combinations adding more modularity and flexibility for upgrading the output power as needed.

In conclusion, the sealed flexible electrode design enables elimination of the bipolar plates in the stacks, thereby significantly reducing the weight and volume, and enhancing the portability. The overall flexible construction of the fuel cell according to this invention provides multiple options to modularly create a fuel cell stack to suit any output power requirement for a range of applications. The individual fuel cells can be stacked on a mechanical frame (shown in FIG. 1). Alternately, a contiguous flexible fuel cell can be wrapped over on to itself, or on a central mandrel to create a self-supporting stack (shown in FIGS. 2, 3 and 5).

Furthermore, the output power can be increased modularly by creating stack arrays that can be externally cooled individually or collectively (shown in FIG. 4), without having to redesign the stack or the cooling apparatus as the stack size increases.

The scope and merits of the fuel cell design as described can be fully appreciated in conjunction with the claims to follow.

What is claimed:

1. An electrochemical fuel cell comprising:
   a stack of a plurality of layers with broadside surfaces of adjacent layers aligned parallel, said stack including;
      non-permeable end layers located at the two broadside ends of the stack, and one or more separator layers located between terminator layers, said separator layers including,
      one or more semi-permeable regions,
      one or more current collecting regions embedded on both sides of the semi-permeable regions, wherein said current collecting regions located on the opposite sides of the semi-permeable regions have opposite polarity, and
      the current collecting regions are in electrical contact with a respective electrode of like electrical polarity,
   wherein the plurality of layers in the stack are sealed along the periphery thereby creating individually sealed one or more channels in between said plurality of layers, and wherein,
      said electrodes of opposite electrical polarity are sealed respectively in the one or more channels located on the opposite sides of the semi-permeable regions and are accessible from outside the sealed one or more channels,
      alternate channels of the one or more channels are set up with a first fluid flow, and the channels adjacent to said alternate channels are set up with a second fluid flow, such that fluids flowing in the adjacent channels are dissimilar, and
      the first and second fluids in adjacent channels diffuse to the opposing surfaces of semi-permeable regions of the separator layer,
   such that an electrochemical reaction between the first and second fluids across the semi-permeable regions results in flow of an electric current in an external electrical load connected between the electrodes of opposite electrical polarity.

2. The electrochemical fuel cell as in claim 1, wherein the plurality of layers are constructed of a flexible material that is chemically inert comprises of at least one material selected from the group consisting of fiberglass with various resins, polymers, PTFE, composite materials and a combination thereof.

3. The electrochemical fuel cell as in claim 1, wherein size of the semi-permeable regions is determined by output power requirement.

4. The electrochemical fuel cell as in claim 1, wherein the semi-permeable regions of the separator layers include a Proton Exchange Membrane (PEM).

5. The electrochemical fuel cell as in claim 4, wherein the Proton Exchange Membrane is coated with a catalyst layer including a noble metal.

6. The electrochemical fuel cell as in claim 4, wherein optional gas diffusion layers are embedded on both sides of the PEM.

7. The electrochemical fuel cell as in claim 6, wherein the gas diffusion layers include a porous material to facilitate the fluid flow to the PEM for enhancing the diffusion of reacting fluids.

8. The electrochemical fuel cell as in claim 1, wherein the embedded current collecting layers are constructed preferably of a highly conducting flexible material including a metallic mesh, such that the current collecting layer conforms to the shape of said one or more channels.

9. The electrochemical fuel cell as in claim 8, wherein the current collecting layers are further coated with a noble metal to further reduce the contact resistance.

10. The electrochemical fuel cell as in claim 1, wherein said one or more channels further include a spacer material constructed of a porous medium or a mesh, to facilitate fluid flow through the channels and enhancing the fluid diffusion to the semi-permeable regions of the separator layer.

11. The electrochemical fuel cell as in claim 10, wherein the spacer material is constructed using a non-metallic material including carbon, fibers with claddings of thermally conducting polymers and nanoparticles, thermally conducting non-metallic materials, a metallic material including stainless steel, anodized copper, nickel, and polymers embedded with metal particles, metallic foams, or a combination thereof.

12. The electrochemical fuel cell as in claim 1, wherein the first fluid is a fuel including hydrogen, or hydrogen mixed with gases including reformates of fluids comprise of at least one selected from the group consisting of ethyl alcohol, methyl alcohol, methane, propane and ammonia, which break up into a hydrogen containing fuel.

13. The electrochemical fuel cell as in claim 1, wherein the second fluid is a gaseous reactant including air, oxygen, oxygen enriched gases, or oxygen enriched liquids.

14. The electrochemical fuel cell as in claim 1, wherein said alternate channels, and said adjacent channels are provided with respective one or more inlet and outlet ports to set up the respective first and second fluid flows in the same or opposite directions, in said alternate channels and said adjacent channels, respectively.

15. The electrochemical fuel cell as in claim 14, wherein the first and second fluids are supplied to the respective one or more inlet and outlet ports of said alternate channels, and said adjacent channels, respectively, using a respective common feed line, or respective multiple separate feed lines.

16. The electrochemical fuel cell as in claim 15, wherein mechanical support further facilitates mounting of one or more cooling means in broadside contact with the electrochemical fuel cell to cool the electrochemical fuel cell by forced air, a circulating cooling fluid, or a desired combination thereof.

17. A multi-stack electrochemical fuel cell comprising:
   a wrapped-over 3-dimensional stack, said stack constructed of a flexible contiguous stack of a plurality of layers with broadside surfaces of adjacent layers aligned parallel, said contiguous stack further including;
   non-permeable end layers located at the two broadside ends of the stack, and one or more separator layers located between terminator layers, said separator layers including,
      non-permeable end layers located at the two broadside ends of the stack, and one or more separator layers located between terminator layers, said separator layers including,
      one or more semi-permeable regions, one or more current collecting regions embedded on both sides of the semi-permeable regions, wherein said current collecting regions located on the opposite sides of the semi-permeable regions have opposite polarity, and the current collecting regions are in electrical contact with a respective electrode of like electrical polarity, wherein the plurality of layers in the stack are sealed along the periphery thereby creating individually sealed one or more channels in between said plurality of layers, and wherein, said electrodes of opposite electrical polarity are sealed respectively in the one or more channels located on the opposite sides of the semi-permeable regions and are accessible from outside the sealed one or more channels, alternate channels of the one or more channels are set up with a first fluid flow, and the channels adjacent to said alternate channels are set up with a second fluid flow, such that fluids flowing in the adjacent channels are dissimilar, and the first and second fluids in adjacent channels diffuse to the opposing surfaces of semi-permeable regions of the separator layer, such that an electrochemical reaction between the first and second fluids across the semi-permeable regions results in flow of an electric current in an external electrical load connected between the electrodes of opposite electrical polarity.

18. The multi-stack electrochemical fuel cell as in claim 17, wherein said flexible contiguous stack is wrapped in one or more turns over itself, to construct said 3-dimensional stack in the rectangular, elliptical, cylindrical, or any desired geometrical shape to conform to a shape governed by an application.

19. The multi-stack electrochemical fuel cell as in claim 17,
wherein said flexible contiguous stack is wrapped in one or more turns over a metal cooling plate that is in close physical and thermal contact with the inner broadside surface of said 3-dimensional stack, to facilitate cooling of the multi-stack electrochemical fuel cell using forced air, cooling fluid, or a combination thereof, and
wherein said cooling plate further includes internal tubing with an inlet and an outlet port for circulating the cooling fluid.

20. The multi-stack electrochemical fuel cell as in claim 17, further supported between one or more external cooling means in close physical and thermal contact with the outer surfaces of said 3-dimensional stack for cooling by forced air, a cooling fluid, or a desired combination thereof, wherein said external cooling means further include optional cooling tubes with respective inlet and outlet ports for circulating the cooling fluid.

21. The multi-stack electrochemical fuel cell as in claim 17,
wherein said flexible contiguous stack is wrapped in one or more turns, around a central metallic mandrel, and
wherein said mandrel is in close physical and thermal contact with the inner surface of said flexible contiguous stack to facilitate cooling of the multi-stack electrochemical fuel cell by cooling the mandrel using forced air, a circulating cooling fluid, or a combination thereof.

22. The electrochemical fuel cell as in claim 17, wherein the first fluid is a fuel including hydrogen, or hydrogen mixed with gases including reformates of fuels comprise of at least one selected from the group consisting of ethyl alcohol, methyl alcohol, methane, and propane which break up into a hydrogen containing fuel, and wherein the second fluid is a gaseous reactant including air, oxygen, oxygen enriched gases, or oxygen enriched liquids.

23. An array electrochemical fuel cell comprising:
an array of a plurality of a wrapped-over 3-dimensional stacks, wherein each one of said 3-dimensional stacks is constructed of a flexible contiguous stack of a plurality of layers with broadside surfaces of adjacent layers aligned parallel, said contiguous stack further including;

non-permeable terminator layers located at the two broadside ends of the stack, and one or more separator layers located between the terminator layers, said separator layers including, non-permeable end layers located at the two broadside ends of the stack, and one or more separator layers located between terminator layers, said separator layers including, one or more semi-permeable regions, one or more current collecting regions embedded on both sides of the semi-permeable regions, wherein said current collecting regions located on the opposite sides of the semi-permeable regions have opposite polarity, and the current collecting regions are in electrical contact with a respective electrode of like electrical polarity, wherein the plurality of layers in the stack are sealed along the periphery thereby creating individually sealed one or more channels in between said plurality of layers, and wherein, said electrodes of opposite electrical polarity are sealed respectively in the one or more channels located on the opposite sides of the semi-permeable regions and are accessible from outside the sealed one or more channels, alternate channels of the one or more channels are set up with a first fluid flow, and the channels adjacent to said alternate channels are set up with a second fluid flow, such that fluids flowing in the adjacent channels are dissimilar, and the first and second fluids in adjacent channels diffuse to the opposing surfaces of semi-permeable regions of the separator layer, such that an electrochemical reaction between the first and second fluids across the semi-permeable regions results in flow of an electric current in an external electrical load connected between the electrodes of opposite electrical polarity.

24. The array electrochemical fuel cell as in claim 23, wherein the first fluid is a fuel including hydrogen, or hydrogen mixed with gases including reformates of fuels comprise of at least one selected from the group consisting of ethyl alcohol, methyl alcohol, methane, and propane which break up into a hydrogen containing fuel, and wherein the second fluid is a gaseous reactant including air, oxygen, oxygen enriched gases, or oxygen enriched liquids.

25. The array electrochemical fuel cell as in claim 23, wherein each one of the 3-dimensional stack includes a cooling means in close physical and thermal contact with the respective inner broadside surfaces for cooling by forced air, a cooling fluid, or a desired combination thereof, and wherein said cooling means further include cooling tubes with respective inlet and outlet ports for circulating the cooling fluid.

26. The array electrochemical fuel cell as in claim 23, wherein plurality of said 3-dimensional stacks are further arranged with one or more cooling means in close physical and thermal contact with the outer broadside surfaces of said 3-dimensional stacks, such that said array is collectively cooled externally using forced air, a cooling fluid, or a desired combination thereof, and wherein said cooling means further include cooling tubes with respective inlet and outlet ports for circulating the cooling fluid.

* * * * *